United States Patent Office 3,274,288
Patented Sept. 20, 1966

3,274,288
PREPARATION OF ORGANOPOLYSILOXANE
RESINS
Glyn I. Harris and Hedley S. B. Marshall, Dinas Powis, Glamorgan, Wales, assignors to Midland Silicones Limited, London, England
No Drawing. Filed Dec. 24, 1963, Ser. No. 333,167
15 Claims. (Cl. 260—825)

This invention relates to improved organopolysiloxane resins and a process for their preparation.

Organopolysiloxane resins have now found wide commercial acceptance, particularly in applications requiring the use of resinous, insulating coatings and as laminating materials under conditions of high humidity and high temperature. Such resins are normally prepared by the hydrolysis or cohydrolysis of hydrolyzable silanes followed by a bodying or partial polymerization, of the hydrolyzate. However, difficulties exist in controlling the hydrolysis and condensation procedure by which these resins are manufactured. For example, if the resin is produced by the hydrolysis of a mixture of, say, alkyl and aryl chlorosilanes the initial hydrolysis step brings about the formation (if only transiently) of the alkyl and aryl silanols. Due probably to the different reactivity imparted to the silanol group by the other silicon bonded substituents the condensation of the silanol groups is a largely haphazard and uncontrolled reaction. This is particularly true when the resin is produced, for example, from a mixture of di- and tri-functional cholorsilanes. The silanols derived from the trifunctional halosilanes are considerably less stable than those derived by hydrolysis from the difunctional halosilanes. Hence, instead of an ordered reaction of the di- and tri-functional silanes with each other there is a tendency for the cross-linking or trifunctional silane to react preferentially with itself thus leading to a resinous material composed of a variety of molecular species in place of a homogeneous cross-linked molecule. Due to this premature reaction of the trifunctional molecules it is necessary in practice to employ a relatively high proportion of the trihalosilane in the hydrolysis step to obtain the desired degree of cross-linking in the ultimate polysiloxane resin.

An object of the present invention is to provide a means whereby organopolysiloxane resins can be prepared in a more controlled manner than has been possible hitherto. A further object is to provide resins having improved structure and consequently more desirable properties. Such improvements are accomplished by employing as the trifunctional reactant a silane containing both alkoxy groups and chlorine atoms as its hydrolyzable substituents. Under suitable hydrolysis conditions the formation of the reactive silanetriol is substantially avoided while retaining the desired functionality of the material.

Accordingly this invention provides a process for the preparation of organosilicon compositions having a ratio of organic groups to silicon atoms in the range from 1.01 to 1.85 comprising forming a mixture of the hydrolysis products of at least one diorganodichlorosilane of the formula $R_2SiCl_2$ and at least one silane of the general formula $RSiCl_nX_{3-n}$ wherein $n$ has a value of from 1 to 2 inclusive, R represents a monovalent radical selected from the group consisting of hydrocarbon radicals and substituted hydrocarbon radicals and X is an alkoxy radical which is less easily hydrolyzed than the chlorine atoms under the conditions of the hydrolysis reaction, said hydrolysis being carried out under conditions wherein the pH value of the hydrolysis medium is maintained within the range from 5.5 to 9.0.

The invention also provides organopolysilicon compositions when prepared by said process.

The difunctional silanes, that is the diorganodichlorosilanes, employed in the process of this invention are represented by the general formula $R_2SiCl_2$ where R is a monovalent hydrocarbon radical or a monovalent substituted hydrocarbon radical. As R groups, there can be present in the chlorosilane hydrocarbon groups, for example, alkyl, alkenyl and aryl groups such as methyl, ethyl, propyl, vinyl, allyl, phenyl and naphthyl or substituted monovalent hydrocarbon groups such as halogenohydrocarbon radicals such as chloromethyl, chlorophenyl and trifluoropropyl and cyanopropyl and aminobutyl groups. Although R can be any of a wide range of substituted and unsubstituted hydrocarbon groups it is normally preferred to employ as the starting products chlorosilanes in which the R groups are selected from methyl, vinyl and phenyl radicals. Specific examples of suitable diorganodichlorosilanes therefore are dimethyldichlorosilane, diphenyldichlorosilane, methylphenyldichlorosilane, methylethyldichlorosilane, methylaminopropyldichlorosilane and methylvinyldichlorosilane.

To provide the trifunctional, or cross-linking, component of the resin the reaction mixture includes a halosilane of the general formula $RSiCl_nX_{3-n}$, where R can be defined as above, $n$ has a value of 1 or 2 and X is an alkoxy group as defined above and preferably contains from 1 to 10 inclusive carbon atoms. The X groups present in the trifunctional silane should be those which are at least partially resistant to the hydrolysis procedure wherein the chlorine atoms are converted into silanol groups. Thus, the X groups are alkoxy radicals which, for the most part, survive the hydrolysis procedure and are present at least to some extent in the hydrolysis or cohydrolysis product. Preferred as X groups are the lower alkoxy radicals, particularly the ethoxy, isopropoxy and butoxy radicals. Illustrative of suitable trifunctional halosilanes are phenylisopropoxydichlorosilane, methyldiisopropoxychlorosilane, vinylethoxydichlorosilane, methylbutoxydichlorosilane, chloromethylisopropoxydichlorosilane, aminopropyldiisopropoxychlorosilane and methylethoxydichlorosilane.

The relative proportions of the difunctional and trifunctional components employed will be such that the ratio of organic groups to silicon atoms in the organopolysiloxane resin molecules will on average fall within the range from 1.01 to 1.85. When a more highly cross-linked resin is required, for example for laminating, the ratio of organic groups to silicon atoms will preferably be from about 1.0 to about 1.5 and the resin can contain a relatively high proportion of the trifunctional silane. If a coating or impregnating resin is desired it may be preferable to employ a high proportion of the difunctional silane.

Although the preferred resins are those prepared from mixtures containing only the difunctional and trifunctional silanes, mono- and/or tetrafunctional halosilanes such as trimethylchlorosilane and silicon tetrachloride can also be included in the reaction mixture. However, when it is desired to include such materials they are best employed as a small proportion only of the total hydrolyzable silanes present.

The di- and trifunctional chlorosilane reactants should be hydrolyzed under substantially neutral conditions, the pH of the hydrolysis medium being maintained within the range 5.5 to 9.0 and preferably within the range 6.5 to 7.5. One convenient and preferred method of maintaining the hydrolysis medium within the required pH range is to employ an ammonium compound such as ammonium carbonate, ammonium carbamate or ammonium bicarbonate as the neutralizing agent. The hydrolysis of the silanes can be performed as a batch or as a continuous process.

As an illustration of one suitable method of performing the invention, the mixture of hydrolysis products is obtained by a cohydrolysis procedure that is by mixing the hydrolyzable chlorosilanes, if necessary in a mutual solvent, and then adding the mixture with agitation to the hydrolysis medium comprising water, a polar solvent, for example ether, and the ammonium carbonate. The temperature at which the hydrolysis operation takes place is not critical but is advantageously maintained below 25° C. When all of the chlorosilane mixture has been added to the hydrolysis medium the aqueous phase is saturated with, say, sodium chloride in order to "salt out" the more polar silanols and siloxanols. If necessary the "salting out" process can be repeated to retrieve the residual quantities of the hydroxylated silanes and siloxanes.

The hydrolysis products comprise high hydroxyl content materials which are probably mainly mixtures of silanols with a small proportion of their low molecular weight condensation products. These hydroxylated materials can be retrieved by removal of the organic solvent for example by stripping.

In a modified form of the invention the diorganodichlorosilane and the alkoxy chlorosilane can be hydrolyzed separately under substantially neutral conditions, that is by maintaining the hydrolysis medium at a pH between 5.5 and 9.0, retrieving the hydrolysis products separately and thereafter mixing them.

In order to increase the molecular size of the resin a "bodying" step can be carried out on the silanol hydrolysis product. This step is well known in the art of preparing organopolysiloxane resins and involves condensation of some of the hydroxyl groups present in the molecules. The condensation can be accomplished simply by the application of heat to the hydrolysis product or, if desired, by the action of heat in the presence of a silanol condensation catalyst, such as for example, zinc octoate. The bodying operation is conveniently carried out at 100% solids, that is without dilution of the hydrolysis products. However bodying can be carried out at a lower solids content by dilution with a suitable solvent. When the viscosity of the resin has increased sufficiently the bodying can be discontinued and the resin diluted, if necessary, with an organic solvent to give a solution of the desired solids content.

The resins obtained by the novel process of this invention are characterized by a relatively high content of silicon-bonded hydroxyl groups and by the ability to cure rapidly at low temperature with or without the aid of a condensation catalyst. Further it is possible by means of the process of this invention to produce resins of more predictable structure and in which the trifunctional silane is more efficiently employed as a cross-linking agent.

Resins produced by the process of the present invention find application as coating and impregnating materials and are particularly useful in the manufacture of electrical insulation.

The following examples are included to aid those skilled in the art to gain a full understanding of the invention. The scope of the invention is defined in the appended claims and is not limited in any manner by the examples.

*Example 1*

A mixture of phenylisopropoxydichlorosilane (846 g., 3.6 moles) and dimethyldichlorosilane (1084 g. 8.4 moles) was added from a dropping funnel, over a period of 3 hours to a hydrolysis system composed of ammonium carbonate (1614 g.), water (2593 g.) and diethyl-ether (2593 g.). The system was agitated during the addition of the chlorosilanes and the hydrolysis temperature maintained at 0° C. by external cooling. During the hydrolysis the pH of the hydrolysis medium was held within the range from 5.5 to 9.0.

When all of the silane mixture had been added the aqueous phase was saturated with sodium chloride and the ethereal phase isolated. The aqueous phase was further extracted with quantities of diethyl ether and the combined ethereal solution, after drying, was stripped at 0° C. under reduced pressure.

The residue (hydroxyl content=12.5% by the Zerewitinoff method) was bodied by heating at 110° C., the water and isopropyl alcohol produced during the condensation were removed from the system by distillation. The heat bodying process was stopped when the polysiloxane had attained a viscosity of 68 cs. at 25° C. when diluted to a 60% by weight solution with toluene.

The polysiloxane resin solution was applied by dipping to glasscloth tape and the impregnated tape placed in an air circulating oven at 150° C. It was found that the resin cured in 30 minutes at this temperature to give a hard, non-tacky but flexible film on the glass tape.

*Example 2*

A mixture of methylisopropoxydichlorosilane (831 g., 4.8 moles) and dimethyldichlorosilane (930 g., 7.2 moles) was hydrolyzed by the procedure described in Example 1 employing a hydrolysis medium composed of ammonium carbonate (1613 g.), water (2564 g.) and diethylether (2564 g.).

The stripped hydrolyzate (hydroxyl content=22.7% when measured by the Zerewitinoff method) was heat bodied at 100% solids, until the viscosity of a 60% solution in toluene had reached a value of 72 cs. when measured at 25° C.

The resin solution was employed to coat glasscloth which arfter being allowed to drain was heated in an air circulating oven for 30 minutes at 150° C. On being removed from the oven and allowed to cool the polysiloxane was found to have cured to a hard, flexible film on the glasscloth.

*Example 3*

A mixture of methylbutoxydichlorosilane (616 g., 3.6 moles) and phenylmethyldichlorosilane (1608 g., 8.4 moles) was hydrolyzed by adding slowly to a system composed of ammonium carbonate (1614 g.) water (4160 g.) and diethyl ether (4160 g.) by the procedure previously outlined.

The bodied hydrolyzate was employed to coat cloth tape. The polysiloxane coating cured to a hard flexible film after being heated to 150° C. for one hour to give a hard but flexible coating.

*Example 4*

A mixture of methyldiisopropoxychlorosilane (590 g., 3.0 moles) and dimethyldichlorosilane (580 g., 4.5 moles) was hydrolyzed by adding slowly to a system composed of ammonium carbonate (808 g.), water (1605 g.) and diethylether (1605 g.) employing the procedure described in Example 1.

After salting out and extraction with diethylether the hydrolysis products were stripped of solvent and bodied by heating at 110° C. The bodying process was terminated and the resulting resin dissolved in toluene to give a solution having a viscosity of 126 cs. at 25° C. at a resin solids content of 60% by weight.

The resin solution was useful as a coating composition and cured to a non-tacky state after 60 minutes when applied to a glasscloth tape and heated at 150° C.

That which is claimed is:

1. A process for the preparation of organosilicon compositions having a ratio of organic groups to silicon atoms in the range from 1.01 to 1.85 comprising forming a mixture of the hydrolysis products of at least one diorganodichlorosilane of the formula $R_2SiCl_2$ and at least one silane of the general formula $RSiCl_nX_{3-n}$ wherein $n$ has a value of from 1 to 2 inclusive, R represents a monovalent radical selected from the group consisting of hydrocarbon radicals and substituted hydrocarbon radicals and X is an alkoxy radical which is less easily hydrolyzable than the chlorine atoms under the conditions of the hydrolysis reaction, said hydrolysis being carried out under conditions wherein the pH value of the hydrolysis medium is maintained within the range from 5.5 to 9.0 at a temperature of from 0–25° C.

2. A process for the preparation of organosilicon compositions as claimed in claim 1 wherein the mixture of hydrolysis products is formed by cohydrolyzing at least one diorganodichlorosilane of the formula $R_2SiCl_2$ and at least one silane of the general formula $RSiCl_nX_{3-n}$ wherein $n$ has a value of from 1 to 2 inclusive, R represents a monovalent radical selected from the group consisting of hydrocarbon radicals and substituted hydrocarbon radicals and X is an alkoxy radical which is less easily hydrolyzed than the chlorine atoms under the conditions of the hydrolysis reaction, said hydrolysis being carried out under conditions wherein the pH value of the hydrolysis medium is maintained within the range from 5.5 to 9.0.

3. A process as claimed in claim 1 wherein the pH value of the hydrolysis medium is maintained within the range from 5.5 to 8.5.

4. The process of claim 2 wherein the pH value of the hydrolysis medium is maintained within the range from 5.5 to 8.5.

5. The process of claim 1 wherein each R is a methyl radical.

6. The process of claim 1 wherein the radicals represented by R are methyl and phenyl radicals.

7. The process of claim 1 wherein the radicals represented by R are methyl, phenyl and vinyl radicals.

8. The process of claim 1 wherein the alkoxy groups represented by R are selected from the group consisting of isopropoxyy radicals and butoxy radicals.

9. The process of claim 1 wherein the pH of the hydrolysis medium is controlled by the addition of ammonium carbonate to the hydrolysis reaction mass.

10. The process of claim 1 further characterized in that the hydrolysis reaction is carried forward in the presence of a polar organic solvent.

11. A process for the preparation of organosiloxane resins comprising
(A) admixing 1 to 85 mol percent of at least one silane of the formula $R_2SiCl_2$ and 15 to 99 mol percent of at least one silane to the formula $RSiCl_nX_{3-n}$ wherein each R is a monovalent hydrocarbon radical, $x$ is an alkoxy radical containing at least 2 and not more than 10 carbon atoms and $n$ has a value from 1 to 2 inclusive,
(B) hydrolyzing the mixture of silanes prepared in (A) by contacting the silanes with an aqueous medium at a temperature between 0° and 25° C. at a pH between 5.5 and 8.5.

12. The process of claim 11 wherein the hydrolysis is carried out in the presence of an ammonium compound.

13. The process of claim 11 wherein the hydrolysis is carried out in the presence of an organic polar solvent.

14. The process of claim 11 wherein the R groups are methyl radicals.

15. The process of claim 11 wherein the aqueous medium contains an ammonium compound and an organic polar solvent.

References Cited by the Examiner
UNITED STATES PATENTS

| | | | |
|---|---|---|---|
| 2,462,267 | 2/1949 | Hyde | 260—46.5 |
| 2,469,625 | 5/1949 | Barry | 260—46.5 |
| 2,589,243 | 3/1952 | Goodwin et al. | 260—448.8 |
| 2,637,719 | 5/1953 | Dereich | 260—46.5 |
| 2,832,794 | 4/1958 | Gordon | 260—46.5 |

MURRAY TILLMAN, *Primary Examiner.*

J. C. BLEUTGE, *Assistant Examiner.*